United States Patent [19]

Kitchen

[11] Patent Number: 4,886,087
[45] Date of Patent: Dec. 12, 1989

[54] FUEL SPILL PREVENTION VALVE

[76] Inventor: Garret Kitchen, 3030 Spangle Rd., Columbus, Ohio 43207

[21] Appl. No.: 245,518

[22] Filed: Sep. 19, 1988

[51] Int. Cl.[4] .......................................... F16L 29/00
[52] U.S. Cl. ................................ 137/68.1; 137/614.04
[58] Field of Search .................. 137/68.1, 614.04, 572, 137/614

[56] References Cited

U.S. PATENT DOCUMENTS

| 310,490 | 1/1885 | Atwood . | |
|---|---|---|---|
| 377,313 | 1/1888 | Laumann . | |
| 409,217 | 8/1889 | Mears . | |
| 3,026,070 | 3/1962 | Sutton et al. | 137/68.1 X |
| 3,052,488 | 9/1962 | Bryning | 137/614.04 |
| 3,630,214 | 12/1971 | Levering | 137/68.1 |
| 3,665,946 | 5/1972 | Robinson | 137/68.1 |
| 3,719,194 | 3/1973 | Anderson et al. | 137/68.1 |
| 3,797,510 | 3/1974 | Torres et al. | 137/68.1 |
| 3,916,929 | 11/1975 | Brown | 137/68.1 |
| 4,562,852 | 1/1986 | Britt . | |
| 4,674,525 | 6/1987 | Richards et al. | 137/614.04 X |

Primary Examiner—John Fox
Attorney, Agent, or Firm—Frank H. Foster

[57] ABSTRACT

The invention comprises a valving arrangement for preventing a fluid spill from a fluid container and comprising an exterior valving member having a bias means urging the valving member closed, the exterior member adapted for connecting in fluid communication at a first end with a fluid conduit and at a second, opposite end for being affixed to the exterior of the container; an interior valving member having a bias means urging the valving member closed and adapted for being affixed in mating arrangement and in fluid communication with the exterior valving member, the interior valving member being in fluid communication at an end opposite its affixed end with the interior of the container; a flow control rod means engaging the valving members and opposing the bias means to prevent the valve members from closing so that upon fracturing the exterior member, the rod means releases the valving members to permit the bias means to close the valving members and prevent fluid communication through the valving members.

1 Claim, 2 Drawing Sheets

FUEL SPILL PREVENTION VALVE

TECHNICAL FIELD

This invention relates to a fluid spill preventing valving arrangement or, a break-away coupling for incorporation into a fluid conduit or the like, and more particularly relates to the utilization of the valving arrangement in a duplicate array for connecting a conduit between two separate fuel tanks, such as are utilized on trucks to connect the two tanks containing the truck fuel so that the fuel within may be drained equally as it is utilized by the engine. The resulting structure is designed to minimize or eliminate spilling in the event of breakage of the connecting conduit as in, for example, an accident or jarring bump upon a highway.

BACKGROUND ART

The problem of fuel spill leakage has assumed greater importance in our society today, what with the increasing utilization of gasoline driven motors and the advent of increasingly stringent pollution regulations. This problem is increasingly found in situations related to travel by motor vehicles upon the highway, and most particularly is seen in the trucking industry. Trucks are particularly vulnerable to fuel leakages since they both carry an extremely large amount of fuel, travel very great distances at increasingly frequent intervals and are exposed to a wide variety of driving conditions. A particular problem which has arisen in the trucking industry in recent years is the breaking off or severing of a conduit which connects the two fuel tanks or saddle tanks as they are known, and enables the two tanks to be drained equally as the truck burns fuel during operation. However, such a conduit is extremely vulnerable due to its position and the strains exerted upon it and can become broken or seriously damaged in an accident, as well as being struck by a projectile on the road. After such an occurrence, the driver may frequently drive an extended length of time before realizing anything wrong has occurred, during which a substantial amount of fuel may be spilled or otherwise lost. Additionally, even if the driver is aware of the accident, it is still very difficult to prevent the spillage of a substantial amount of fuel on the highway or the like. Accordingly, there exists a need for a reliable, inexpensive and easily adaptable arrangement to fit on currently utilized truck fuel connecting systems, and such a valving mechanism can also be utilized in a variety of other fluid connecting arts.

The prior art has developed a number of valving systems which are designed to minimize the leakage occurring from a break in a variety of different fluid conducting systems. However, to date there has not been developed a suitable arrangement for use in the trucking or motor vehicle related arts.

U.S. Pat. No. 377,313 to Laumann discloses an early device for preventing the escape of steam and water from a boiler when the devices controlling their outlet are either removed or broken off. The structure utilizes a separate valve with a rod which holds another valve away from its valve seat. When the initial rod is broken, a spring pushes the valve closed.

U.S. Pat. No. 4,562,852 discloses a combination safety and service valve which includes a body having a sealing portion for closing an opening in a high pressure tank in an external portion. When the sealing portion closes the tank opening it is positioned externally of the tank and utilizes a ball chamber and its flow passage in a spherical ball loosely received in the chamber for preventing the escape of the contents of the tank if the external portion were to separate from the sealing portion.

U.S. Pat. No. 310,490 to Atwood et al. discloses a valve which is directly connected to a steam boiler by having a part thereof pass through the shell of the boiler, with the object of the apparatus being to provide gauge cocks and valves which are adapted for connecting with a boiler in a manner in which the valve closing parts are within the boiler and are open against the pressure exerted by the steam. The valve closing parts are adapted to prevent the dangerous escape of steam into the cab of a locomotive when, due to accident, the projecting part of the gauge cock and valve spindle are broken off.

U.S. Pat. No. 409,217 discloses a safety valve attachment for gauge cocks which consists of an auxiliary valve attachment to the main valve, operating in conjunction with the main valve but which operates independently during an emergency so as to provide an automatic and independent means of closing the opening into a boiler in case the cock should become broken and steam or water be allowed to escape.

Although there are a variety of emergency valve structures adapted for closing a conduit in case of breakage, there still exists a need for the utilization of an economic and reliable valve which is adaptable to existing machinery in the trucking art. Additionally, there is an additional need to manufacture a device so that it will fracture only in a predetermined section, so that the valving arrangement can be effectively operated in the event of an accident, i.e., upon fracture, it breaks in a manner that enables the emergency valving arrangement to be effectively activated.

BRIEF DISCLOSURE OF THE INVENTION

The invention relates to a valving arrangement for preventing a fluid spill such as gasoline from a fluid container such as a gas tank and comprises an exterior valve having a bias means such as a spring controlled rod which urges the valving member closed, the exterior valve being connected at a first end with a fuel line and at a second, opposite end it is screwed into an opening in the exterior of the container. The arrangement also includes an interior valve also having a bias means such as a spring controlled rod which urges the valving member closed and is designed to be affixed in mating arrangement as it is connected with the exterior valve. Also, the interior valve is connected, i.e., in fluid communication at an end opposite its screwed in end to the wall with the interior of the gas tank. Flow i.e., spring control rods are present within each valve and oppose the bias means i.e., the opposing spring controlled rod so as to prevent the valve from closing during operation. Upon fracturing the exterior valve, the rod releases the valves from the created tension so as to permit the two spring rods to close the valves and prevent further fluid flow through the valves.

Figure 1:
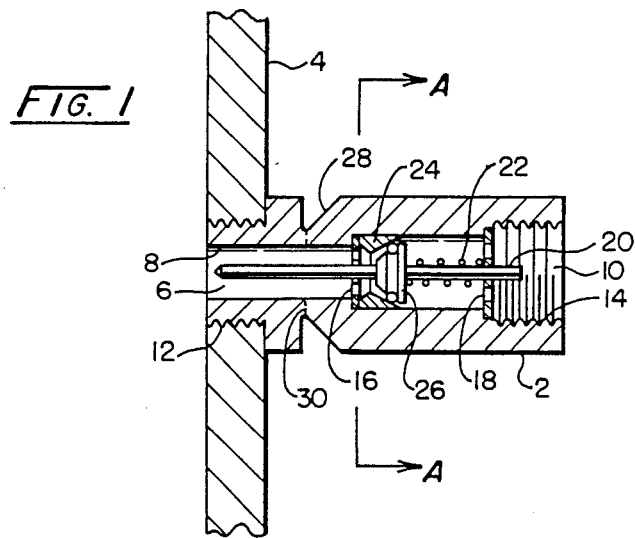
FIG. 1 discloses a cross-sectional diagram of the exterior spring actuated valving member attached to the wall of a fluid container.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 discloses a valve member 2 which has been securely positioned, i.e., screwed, into an opening in a substrate 4, such as a fluid or fuel container tank wall. Valve member 2 features a substantially cylindrical inner bore 6 having a varying cross section and externally threaded openings 8 at the container wall and 10 at the opposite end for connecting to a fuel conduit, or the like. The external bore wall 12 and internal bore wall 14 at the respective conduit ends 8 and 10, respectively, are each threaded for secure attachment and removability from the sections they will make fluid contact with. Inside bore 6 are positioned baffles 16 and 18, each which encompass the bore column and contains a central opening for a bias means, which in the preferred embodiment is a spring controlled rod 20 which is continually urged to move to close the valve by spring 22. Also, the baffles contain fluid apertures, and two of the preferred structures of these baffles are set forth in FIGS. 2A and 2B, to be discussed, infra. Additionally, a preferred embodiment of the spring controlled rod 20, which can, in the broadest embodiment, be a variety of equivalent mechanical linkages, is illustrated in FIG. 3. Bore 6 additionally features a circumferential narrowing at 24, which section is configured to halt the movement of bore closing member 26, which is circumferentially mounted around rod 20 and has a truncated conical shape. Valving member 2 further features a recessed and indented exterior tubular structure, or "breaking zone" which extends circumferentially around the member at 28 so that in the event of application of a strong, i.e., sufficient external force the valving member will almost certainly fracture within the breaking zone, e.g., along line 30. The member can be made of a variety of substances, but is particularly preferred that a hard, wear-resistant plastic be utilized and, if desired, the mechanical structure section 28 can be physically weaker than the remaining member so as to ensure that any valve breakage which might take place would occur here.

Figure 2A:
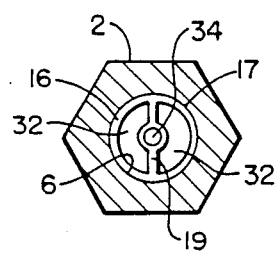
FIGS. 2A and 2B disclose cross-sectional views of two embodiments of the valving member of FIG. 1 along line AA.
Figure 2B:
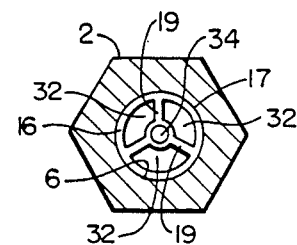
Figure 3:
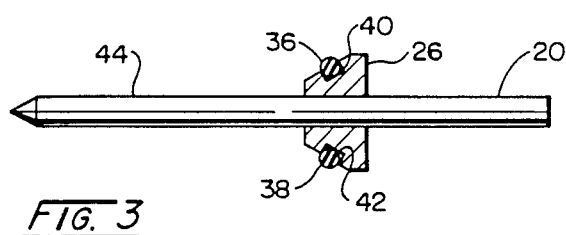
FIG. 3 discloses a closeup of the spring activated, flow control rod having the bore closing member positioned around its circumference.

FIGS. 2A and 2B, as indicated above, each disclose alternative cross-sectional views of FIG. 1 along line AA in which the valving member 2 is preferably hexagonal in external dimension. The views feature baffle 16 present within the bore 6; baffle 16 being comprised of a tough polymeric rim 17 such as teflon and containing flow dividers 19 which separate bore 6 into at least two open, semicircular apertures 32 spaced circumferentially around a central aperture 34 which is adapted for positioning the spring controlled rod 20. The fluid flowing through bore 6 passes through openings 32 as it makes its way through the valving arrangement. Baffle 18 is preferably of similar or identical construction to baffle 16.

FIG. 3, as indicated above, discloses the preferred spring controlled rod 20 which is preferably made of a tough, polymer such as teflon and contains bore closing member 26, typically forming a truncated cone and having corresponding O-rings 36 and 38 positioned in their respective sockets 40 and 42 along the truncated conical surface of member 26. Rings 36 and 38 serve to reduce the friction and other wearing forces which occur during activation of member 26 when released by spring 22 in the event of member rupture. Rod 20 further has a pointed tip 44 which is in the preferred embodiment adapted to affix onto and hold in place the central member (not shown) when in mating position with an oppositely directed valving member and its accompanying spring controlled rod.

Figure 4:
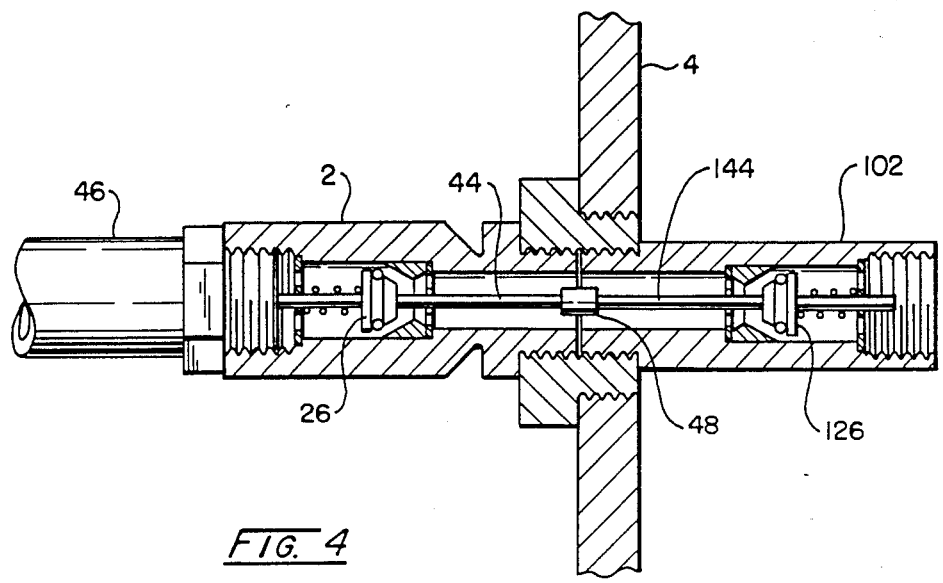
FIG. 4 discloses the complimentary mating arrangement of the device shown in FIG. 1, with a separate valving member each connected on opposite sides of the fluid container wall.

FIG. 4 discloses a simplified representation of a mating relationship between two spring valving members 2 and 102 in fluid communication and threadably attached on opposing sides of an opening in container wall 4, which is typically a fuel tank wall. It is not necessary that the two valves be similar or identical in makeup, although it is preferred that inner valving member 102 not have the "breaking zone" feature of member 2, but be otherwise the same. Valve member 2 is connected at its non attached end to fluid conduit 46, typically a fuel line and valve member 102 is in similar fashion connected to a fluid conduit which is in communication with the fluid pool inside the fuel tank. Of particular note is the presence of central member 48, typically made of a tough, resilient polymer such as teflon, which is preferred to separate the spring controlled rods 44 and 144. Although preferred to utilize member 48, the two opposing rods can be designed so as to oppositely press against each other without the necessity for member 48 to separate their tips.

Upon severing of the valving arrangement, such as by application of an external force to member 2, valving member 2 is sheared off and member 48 is knocked loose. Additionally, the spring controlled rods which are in tension are released and members 26 and 126 on each of rods 44 and 144 advance up against their valve seats to seal and thus eliminate the flow both in the inner container, and if not destroyed, the outer container from leakage or fuel spill. Additionally, exterior valving member 2 can be manually closed if desired by a manual valve (not shown).

Figure 5:
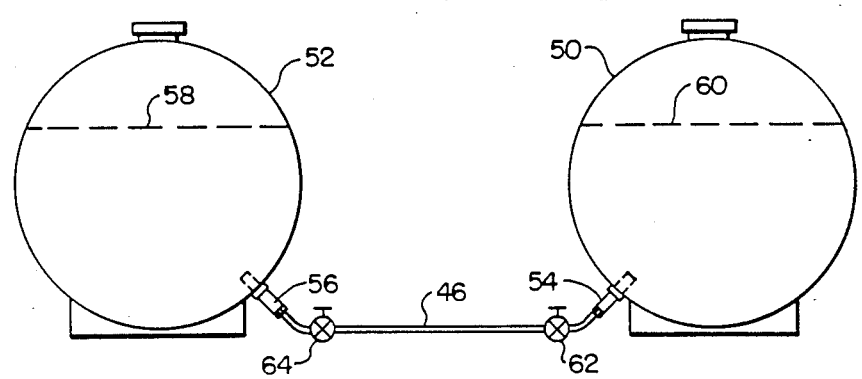
FIG. 5 discloses a particularly preferred embodiment in which the valving arrangement of FIG. 4 is utilized in each of the two fuel tanks which are connected by a conduit.

In FIG. 5 is set forth the preferred environment for usage of the valving arrangement wherein conduit 46 connects fuel tanks 50 and 52 by utilization of the aforementioned valving arrangements 54 and 56, respectively. Additionally, a pair of manually activatable valves 62 and 64 are positioned along conduit 46, each valve being interposed between each valving arrangement 54 and 56 and conduit 46 so as to permit manual shut off in the event the conduit is ruptured between the valving arrangements. Fuel tanks 50 and 52 are typically those found on large trucks such as eighteen wheelers and the like and are known in the art as saddle tanks. However, the invention is also suitable for use in a wide variety of similar environments. Additionally, the construction of the fuel storage system in such a truck is that the fuel is drawn from one of the tanks to be utilized in the engine and it is important for both dimensional stability and overall fluid economy that the fluid tanks be kept substantially equal in fuel. This is shown in the figure by the equivalence of the respective heights of the fluid lines 58 and 60 within containers 52 and 50, respectively.

While certain preferred embodiments of the present invention have been disclosed in detail, it is to be understood that various modifications may be adopted without departing from the spirit of the invention or scope of the following claims.

I claim:

1. An apparatus for preventing a fuel spill from a plural container fuel storage system having an interconnecting fluid conduit in the event the conduit is ruptured, the apparatus including at least two valving arrangements one for connecting each end of said fluid conduit to a different one of said fuel containers, each valving arrangement comprising:

(a) an exterior valving member having a bias means urging the valving member closed, the exterior member adapted at a first end for connecting in fluid communication with the fluid conduit and at a second, opposite end for being affixed to the exterior of a said container;

(b) an interior valving member having a bias means urging the valving member closed and adapted for being affixed in mating arrangement and in fluid communication with the exterior valving member, the interior valving member being in fluid communication at an end opposite its affixed end with the interior of the container;

(c) a flow control rod means engaging the valving members and opposing the bias means to prevent the valve members from closing so that upon fracturing the exterior member, the rod means releases the valving means to permit the bias means to close the valving members and prevent fluid communication through the valving members, the flow control rod comprising a pair of aligned non-frangible rods each extending centrally from a different one of the valving members to form a clearence space, each rod having an opposed tapered tip and an interposed, central member seating against the opposed tapered tips but not surrounding non-tapered portions of the rods.

* * * * *